Nov. 16, 1937.  A. B. BROWN ET AL  2,099,102
REEL
Filed Oct. 11, 1933  2 Sheets-Sheet 1
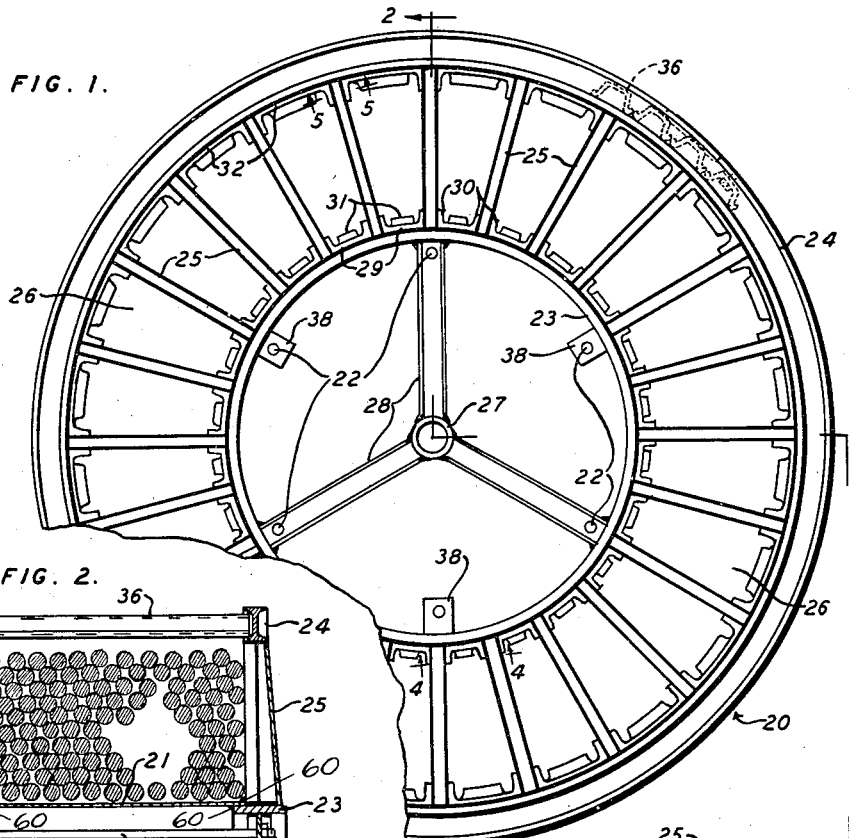
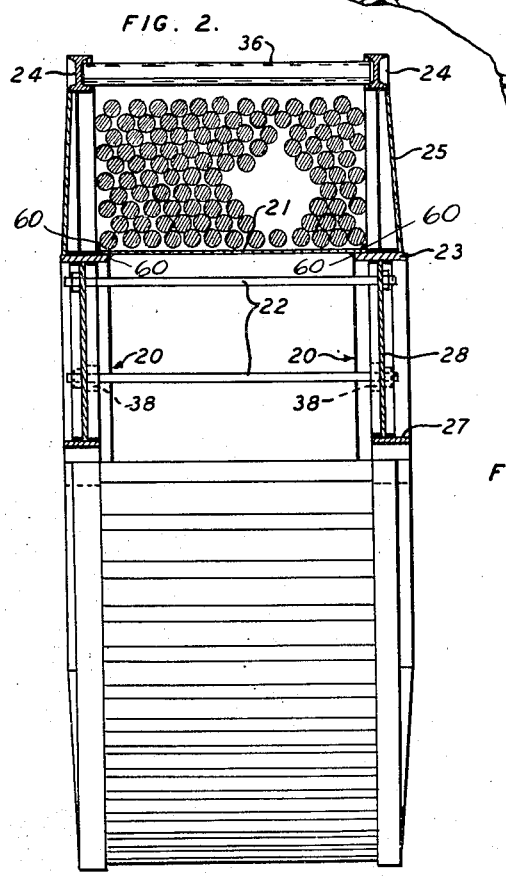
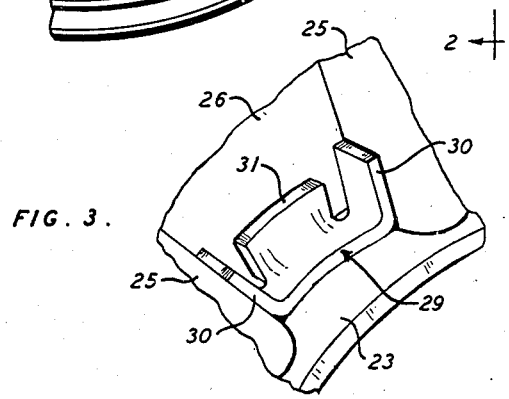
INVENTORS
A. B. BROWN
C. T. SIEBS
BY
E. R. Nowlan
ATTORNEY Nov. 16, 1937.  A. B. BROWN ET AL  2,099,102
REEL
Filed Oct. 11, 1933   2 Sheets-Sheet 2
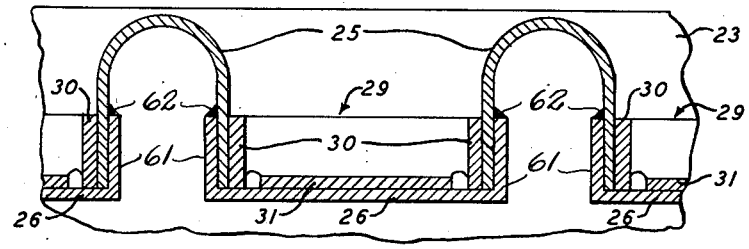
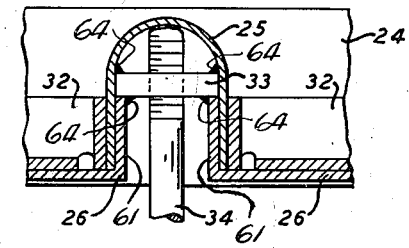
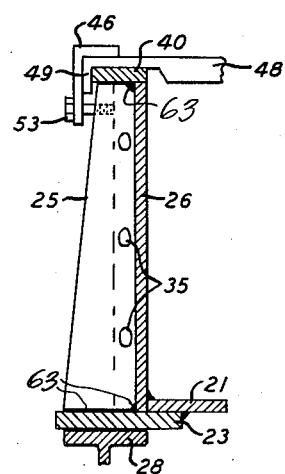
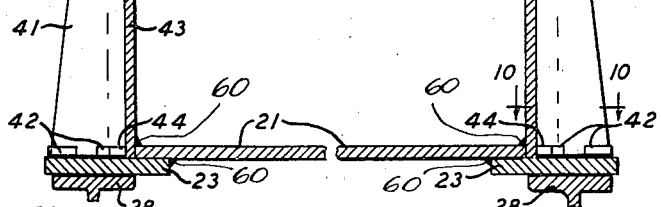
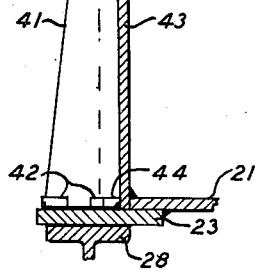
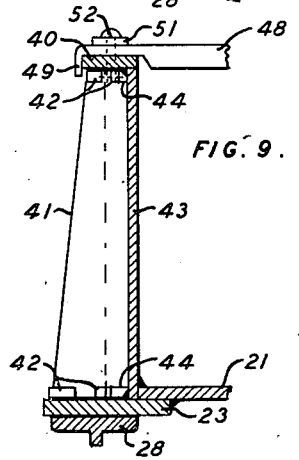
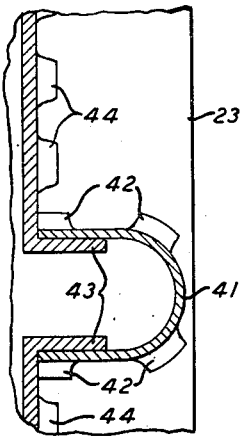
INVENTORS
A. B. BROWN
C. T. SIEBS
BY
E. R. Nowlan
ATTORNEY Patented Nov. 16, 1937

2,099,102

UNITED STATES PATENT OFFICE 2,099,102

REEL

Alfred B. Brown, Essex Fells, and Claude T. Siebs, Fanwood, N. J., assignors to Western Electric Company, Incorporated, New York, N. Y., a corporation of New York Application October 11, 1933, Serial No. 693,060

15 Claims. (Cl. 242—77)

This invention relates to reels and more particularly to metal reels for supporting wound material such as communication cable.

An object of the invention is to provide a simple, durable and inexpensive reel for supporting wound material having a high degree of strength commensurate with its weight.

In accordance with one embodiment of the invention the reel comprises two heads each having truncated triangular spokes having their ends secured by means of welding, or other means, to inner and outer rims, channel shaped webs secured to the spokes and rims, a hub supported by three or more spokes secured to the inner rim and a drum connecting the inner rims of the two heads. The ends of the spokes and webs are fastened to the inner and outer rims by serrating the edges of the spokes and webs providing projections at right angles thereto which are welded to the inner and outer rims. In another embodiment of the invention the projections on the spokes and webs are omitted and they are fastened to each other and to the rims by providing auxiliary channel pieces between the spokes adjacent the rims and welding these auxiliary pieces to the rim, the spokes, and the webs.

Other objects and features of the invention will become apparent from the following detailed description and accompanying drawings, of a preferred embodiment of the invention wherein Fig. 1 is a side elevational view of a cable reel of a preferred embodiment of the invention with a portion thereof broken away;

Fig. 2 is a front elevational view, partially in section, taken along the line 2—2 of Fig. 1, with a supply of cable wound thereon;

Fig. 3 is a perspective view of a reenforcing channel member employed in the reel shown in Figs. 1 and 2;

Fig. 4 is an enlarged sectional view of the spokes and webs taken along the line 4—4 of Fig. 1;

Fig. 5 is an enlarged sectional view taken along the line 5—5 of Fig. 1 showing the means employed for fastening the outer end of the cable to the reel;

Fig. 6 is a partial sectional elevational view of another embodiment of the invention employing a flat outer rim;

Fig. 7 is a partial sectional elevational view of another embodiment of the invention employing spokes and webs having serrated edges which are secured to the inner and outer rims;

Figs. 8 and 9 are partial sectional views showing other methods of securing lagging to flat outer rims, and Fig. 10 is a sectional view taken along the line 10—10 of Fig. 7.

Referring to the drawings wherein like parts are indicated by identical reference numerals a preferred embodiment shown in Figs. 1 and 2 comprises a pair of heads 20, and a drum secured between the heads. The heads 20 and drum 21 are held together by means of three or more through-bolts 22. When desired the drum may be welded to the heads as shown at 60 in Fig. 2 and the through-bolts 22 can be omitted.

Each of the heads 20 comprises an inner rim 23, an outer rim 24, spokes 25, and webs 26 connected together and to the inner and outer rims, and a hub 27, on which the reel is rotated, secured to the inner rim 23 by means of spokes 28. The inner rim 23 (Figs. 1 and 2) has been shown as a flat rim wide enough to permit the drum 21 to be assembled over the inner side of the rim and the outer rim 24 has been shown formed from an I-beam, although rims of other desirable shapes may also be used. The spokes 25 are formed of steel and are tapered from the inner rim 23 to the outer rim 24 as shown in Fig. 2, since the maximum strength of the spoke is desired adjacent the inner rim 23. The webs 26 preferably of thicker material than that of the spokes as shown in Figs. 4 and 5, are formed so that the upturned edges or flanges 61 thereof are within the spokes 25 and form a double wall. The height of the upturned portion of the web 26 may be varied at any point along the spoke to obtain the desired strength at that point. The edge of the upturned portion of the web 26 may be welded to the adjacent spoke 25 as shown at 62 in Figs. 4 and 5, or as shown in Fig. 6 the spokes 25 may be provided with slots 35 over the upturned portions of the web 26 in which welding material is deposited to secure the spokes 25 and webs 26 together. Formed auxiliary channel members 29 (Figs. 1 and 3) also preferably of thicker material than that of the spokes 29 as shown in Figs. 4 and 5 and having upturned portions 30 in contact with the spokes 25 and an upturned portion 31 closing one end of the channel in contact with the web 26 are provided to strengthen the reel at the point adjacent the inner reel 23 and to facilitate the assembly of the reel head 20.

With the auxiliary channel members 29 formed as shown and above described, it is possible to join the spokes 25, webs 26, the inner rim 23, and the channel member 29 to one another, by spot welding.

Similar auxiliary channel members 32 are employed to secure the spokes 25 and webs 26 and outer rim 24 together. When desired the projection 31 on the auxiliary member 29 and the corresponding projection on the auxiliary member 32 may be omitted or the entire auxiliary members 29 and 32 may be omitted and the spokes 25 and webs 26 welded directly to the inner and outer rims 23 and 40, respectively, as shown at 63 in Fig. 6, or the alternate construction shown in Figs. 7 to 10, inclusive, and described below can be used.

To fasten the outer end of the cable to the reel head a nut 33 and a bolt 34 are provided (Fig. 5). The nut 33 is clamped between the curved portion of one of the spokes 25 and the turned-up edges or projections of the adjacent webs 26, and if desired may be further secured in position by means of welding, as shown at 64 in Fig. 5. When the nut 33 is not secured to the spoke and webs by means of the welding shown, it may be moved to any position along the spoke to accommodate any depth of cable on the reel.

When the outer rim 24 is made from an I-beam as shown in Figs. 1 and 2, lags 36 may be used, such as are disclosed in U. S. Patent No. 1,944,188, issued January 23, 1934 to L. R. McGuire, for Reels for transporting cable. In accordance with the disclosure referred to, the lags 36 fit within the opposed inside channels of the outer rims 24.

Some of the through-bolts 22 pass through holes in the spokes 28 and other through-bolts 22 pass through holes in lugs 38 which are suitably secured to the inner rim 23.

A flat or rectangular rim 40 is secured as shown in Figs. 6 to 9 inclusive. Different types of lagging may be used which are described below.

The ends of the spokes 25 and webs 26 shown in Figs. 1 to 5 inclusive, are butted against the inner and outer rims 23 and 24. In another preferred embodiment shown in Figs. 7 to 10 inclusive, spokes 41 are employed which are serrated at the ends and the resulting projections 42 formed at right angles to the sides of the spokes. The projections 42 will, in assembly, lie flat against the inner and outer rims 23 and 40 and are readily fastened thereto by spot welding. In a similar manner the webs 43 are serrated at the ends and the resulting projections 44 are spot welded to the inner and outer rims 23 and 40.

Formed metal lags 45 (Fig. 7) adapted for use with rectangular outer rims are assembled around the outside of the rims 40 and are held in place by rims 46, which are formed from angle iron, and fit around the outer rims 40 to hold the ends of the lags 45 against the top of the outer rims 40. The rims 46 are secured in place by means of several through-bolts 47. A modification of the lag is shown in Fig. 6, in which the metal lag 48, similar to the lag 45 (Fig. 7), is used, except with the lag 48 as a downward projection 49, which extends between the side of the rim 46 and the outer side of the outer rim 40. Several bolts 50 (Fig. 8) may be passed through apertures in the spokes 41 on each of the heads 20, or several cap screws 53 (Fig. 6) may be secured to the spokes 41, to hold the rims 46 in place, instead of the through-bolts 47 (Fig. 7).

Another method of fastening the lags 48 to the reel is shown in Fig. 9, in which a keeper strip or flat ring 51 is secured around each of the heads 20 over the lags 48, and secured to the outer rim 40 by means of several bolts 52.

While several embodiments of the invention have been shown and described in detail, it is to be understood that the invention is generic in character and is not to be construed as limited to this particular embodiment, since numerous modifications thereof may be made by persons skilled in the art, without departing from the spirit of applicants' invention, the scope of which is to be determined by the appended claims.

What is claimed is:

1. In a reel, a rim, and a spoke having its edges serrated to produce projections therefrom, said projections being at an angle to said spoke and abutting against said rim and the spoke being secured thereby directly to said rim.

2. In a reel, a drum, and a pair of heads, each of said heads comprising an inner rim, an outer rim, a plurality of truncated triangular spokes having their ends secured by means of welding to the inner and outer rims, a plurality of channel shaped webs having flanges at an angle to the main portion and located within and secured to the spokes, said webs secured to the inner and outer rims, a hub, and other spokes secured to the hub and to the inner rim for supporting the hub, said drum adapted to fit over the inner rim and abut against the webs, and bolts associated with said other spokes for securing the heads and the drum together to form a reel.

3. In a reel, a drum, and a pair of heads, each of the heads comprising an inner rim, an outer rim, a plurality of truncated triangular spokes, a plurality of webs, and a plurality of reenforcing members for securing the spokes, webs, and rims together, having a surface in contact with one of the rims between each pair of adjacent spokes, two upturned portions in contact with the pair of adjacent spokes, and a third upturned portion in contact with the web connecting the pair of spokes, a hub, and other spokes secured to the hub and to the inner rim for supporting the hub, said drum adapted to fit over the inner rims and abut against the webs, and bolts associated with said other spokes for securing the heads and the drum together to form a reel.

4. In a reel, an inner rim, an outer rim, channel shaped spokes, webs having flanges thereon at an angle to the main portion of the webs, the flanges being located within and secured to the spokes, said spokes and webs having projections therefrom at an angle to the spokes and webs and secured to said rims.

5. In a reel, a drum, and a pair of heads, each of said heads comprising an inner rim, an outer rim, a plurality of truncated triangular spokes having their ends secured to the inner and outer rims, a plurality of channel shaped webs having flanges at an angle to the main portion and secured to the spokes and having their ends secured to the inner and outer rims, a hub, and other spokes secured between the hub and the inner rim for supporting the hub, and bolts associated with said other spokes for securing the heads and the drum together to form a reel.

6. In a reel, a cylindrical open ended drum, and a pair of heads each comprising a hub, a first plurality of spokes secured to the hub, an inner rim secured to the said spokes, a second plurality of channel shaped spokes secured at their inner ends to the inner rim, a plurality of web members located in alternation with the spokes of the second plurality and secured to the inner rim and provided with flanges turned into the channels of the neighboring spokes and secured therein, and an outer rim secured to the outer ends of the spokes of the second plurality and to the web members.

7. In a reel, a cylindrical open ended drum, and a pair of heads each comprising a hub, a first plurality of spokes secured to the hub, an inner rim secured to the said spokes, a second plurality of channel shaped spokes secured at their inner ends to the inner rim, a plurality of web members located in alternation with the spokes of the second plurality and secured to the inner rim and provided with flanges turned into the channels of the neighboring spokes and secured therein, an outer rim secured to the outer ends of the spokes of the second plurality and to the web members, and a reenforcing member secured to each web member and to the spokes at each side of such web member and to the inner rim.

8. In a reel, a cylindrical open ended drum, and a pair of heads each comprising a hub, a first plurality of spokes secured to the hub, an inner rim secured to the said spokes, a second plurality of channel shaped spokes secured at their inner ends to the inner rim, a plurality of web members located in alternation with the spokes of the second plurality and secured to the inner rim and provided with flanges turned into the channels of the neighboring spokes and secured therein, an outer rim secured to the outer ends of the spokes of the second plurality and to the web members, a reenforcing member secured to each web member and to the spokes at each side of such web member and to the inner rim, and a reenforcing member secured to each web member and to the spokes at each side of such web member and to the outer rim.

9. In a reel, a cylindrical open ended drum, and a pair of heads each comprising a hub, a first plurality of spokes secured to the hub, an inner rim secured to the said spokes, a second plurality of channel shaped spokes secured at their inner ends to the inner rim, a plurality of web members located in alternation with the spokes of the second plurality and secured to the inner rim and provided with flanges turned into the channels of the neighboring spokes and secured therein, an outer rim secured to the outer ends of the spokes of the second plurality and to the web members, a reenforcing member secured to each web member and to the spokes at each side of such web member and to the inner rim, a reenforcing member secured to each web member and to the spokes at each side of such web member and to the outer rim, and a plurality of bolts to secure the drum and the two heads together.

10. In a reel head, an inner rim, an outer rim, a plurality of spokes therebetween each tapering from the inner rim to the outer rim, a plurality of webs, and a plurality of reenforcing members for securing the spokes, webs, and rims together, each having a surface in contact with one of the rims between a pair of adjacent spokes and upturned portions in contact with the pair of spokes and a third upturned portion in contact with a web between the pair of spokes.

11. In a reel, a flat rim, and a spoke disposed at an angle to the flat rim and abutted at one end thereof against the rim and formed with integral projections disposed at an angle to the spoke and secured directly to the flat inner face of the rim.

12. In a reel, a head comprising a flat rim and a web disposed at an angle to the flat rim and formed with integral projections disposed at an angle to the web and secured directly to the flat inner face of the rim.

13. In a reel, a head comprising a rim and a web having its edges serrated to produce projections therefrom, said projections being at an angle to said web and abutting against said rim and the web being secured thereby directly to said rim.

14. In a reel head, an inner rim, an outer rim, a plurality of spokes therebetween each tapering from the inner rim to the outer rim, a plurality of webs, and a plurality of reenforcing members for securing the spokes, webs, and rims together, each having a surface in contact with one of the rims between a pair of adjacent spokes and upturned portions in contact with the pair of spokes.

15. In a reel head, an inner rim, an outer rim, a plurality of spokes therebetween each tapering from the inner rim to the outer rim, a plurality of webs, and a plurality of reenforcing members for securing the spokes, webs, and rims together, each having a surface in contact with one of the rims between a pair of adjacent spokes and upturned portions in contact with the pair of spokes and secured thereto.

ALFRED B. BROWN.
CLAUDE T. SIEBS.